(12) United States Patent
Matthews

(10) Patent No.: US 10,180,328 B2
(45) Date of Patent: Jan. 15, 2019

(54) AUTOMATING DISTRIBUTION OF WORK IN A FIELD

(71) Applicant: AGCO Corporation, Hesston, KS (US)

(72) Inventor: Paul Ross Matthews, Dietmannsried (DE)

(73) Assignee: AGCO Coporation, Duluth, GA (US)

( * ) Notice: Subject to any disclaimer, the term of this patent is extended or adjusted under 35 U.S.C. 154(b) by 271 days.

(21) Appl. No.: 14/904,203

(22) PCT Filed: Jul. 10, 2014

(86) PCT No.: PCT/US2014/046216
§ 371 (c)(1),
(2) Date: Jan. 11, 2016

(87) PCT Pub. No.: WO2015/006600
PCT Pub. Date: Jan. 15, 2015

(65) Prior Publication Data
US 2016/0146611 A1    May 26, 2016

Related U.S. Application Data

(60) Provisional application No. 61/844,476, filed on Jul. 10, 2013.

(51) Int. Cl.
*G01C 21/00* (2006.01)
*G01C 21/20* (2006.01)
(Continued)

(52) U.S. Cl.
CPC ............ *G01C 21/20* (2013.01); *A01B 69/001* (2013.01); *A01B 69/008* (2013.01); *A01B 79/005* (2013.01); *A01D 34/008* (2013.01);
*G05D 1/0088* (2013.01); *G05D 1/0217* (2013.01); *G05D 1/0291* (2013.01);
(Continued)

(58) Field of Classification Search
None
See application file for complete search history.

(56) References Cited

U.S. PATENT DOCUMENTS 6,119,069 A * 9/2000 McCauley ............... G06K 9/48
702/5
6,128,574 A * 10/2000 Diekhans ............. A01B 79/005
701/410
(Continued)

FOREIGN PATENT DOCUMENTS

DE    4423083 A1    1/1995
DE    19705842 A1   8/1998
(Continued)

OTHER PUBLICATIONS

International Search Report for International Application No. PCT/US2014/046216, dated Oct. 21, 2014.
(Continued)

*Primary Examiner* — Jonathan M Dager

(57) ABSTRACT

In one embodiment, a method comprising identifying field boundaries from aerial imagery; detecting entry upon a first field by an agricultural machine without operator intervention, the first field within the identified field boundaries; and providing a first path to be traversed in the first field at least in part by the agricultural machine.

18 Claims, 10 Drawing Sheets

(51) Int. Cl.
*A01B 69/00* (2006.01)
*A01B 69/04* (2006.01)
*A01B 79/00* (2006.01)
*G05D 1/02* (2006.01)
*A01D 34/00* (2006.01)
*G05D 1/00* (2006.01)
*A01D 101/00* (2006.01)

(52) U.S. Cl.
CPC ....... G05D 1/0297 (2013.01); *A01D 2101/00* (2013.01); *G05D 2201/0201* (2013.01)

(56) References Cited

U.S. PATENT DOCUMENTS

| | | | | |
|---|---|---|---|---|
| 6,199,000 | B1 * | 3/2001 | Keller | A01B 79/005 701/50 |
| 6,205,381 | B1 * | 3/2001 | Motz | A01B 69/008 340/988 |
| 6,236,916 | B1 * | 5/2001 | Staub | A01B 69/008 701/23 |
| 6,236,924 | B1 * | 5/2001 | Motz | A01B 69/008 172/4.5 |
| 6,255,793 | B1 * | 7/2001 | Peless | A01D 34/008 180/168 |
| 6,336,051 | B1 * | 1/2002 | Pangels | A01B 79/005 700/207 |
| 6,424,295 | B1 * | 7/2002 | Lange | A01C 23/007 342/26 R |
| 6,463,374 | B1 * | 10/2002 | Keller | A01B 69/007 111/200 |
| 6,549,852 | B2 * | 4/2003 | Hanson | A01B 79/005 702/2 |
| 6,876,920 | B1 * | 4/2005 | Mailer | A01B 69/00 342/457 |
| 7,110,881 | B2 * | 9/2006 | Gray | A01B 69/008 340/995.19 |
| 7,228,214 | B2 * | 6/2007 | Flann | A01B 69/008 180/168 |
| 7,245,999 | B2 * | 7/2007 | Dietsch | G05D 1/0297 172/4.5 |
| 7,502,678 | B2 * | 3/2009 | Diekhans | A01B 69/008 172/4.5 |
| 8,046,139 | B2 * | 10/2011 | Diekhans | A01D 41/1278 340/990 |
| 8,433,483 | B2 * | 4/2013 | Han | A01B 69/008 180/204 |
| 8,634,960 | B2 * | 1/2014 | Sandin | G05D 1/028 56/10.2 E |
| 8,635,011 | B2 * | 1/2014 | Senneff | A01B 79/005 172/233 |
| 8,694,382 | B2 * | 4/2014 | Aznavorian | G05D 1/021 250/307 |
| 9,008,918 | B2 * | 4/2015 | Missotten | A01B 69/007 701/466 |
| 9,188,982 | B2 * | 11/2015 | Thomson | G05D 1/0274 |
| 9,363,945 | B2 * | 6/2016 | Jagenstedt | G05D 1/0219 |
| 9,497,901 | B2 * | 11/2016 | Willgert | G05D 1/0246 |
| 9,788,481 | B2 * | 10/2017 | Das | A01D 34/008 |
| 9,804,604 | B2 * | 10/2017 | Mattsson | A01G 25/16 |
| 9,886,036 | B2 * | 2/2018 | Douglas | G05D 1/0217 |
| 9,904,963 | B2 * | 2/2018 | Rupp | H04W 4/70 |
| 9,915,952 | B2 * | 3/2018 | Dollinger | A01B 69/008 |
| 2002/0198654 | A1 * | 12/2002 | Lange | A01B 69/008 701/400 |
| 2003/0208319 | A1 * | 11/2003 | Ell | A01B 79/005 702/5 |
| 2004/0068352 | A1 * | 4/2004 | Anderson | A01B 69/008 701/25 |
| 2004/0193348 | A1 * | 9/2004 | Gray | A01B 69/008 701/50 |
| 2004/0193349 | A1 * | 9/2004 | Flann | A01B 69/008 701/50 |
| 2005/0075785 | A1 * | 4/2005 | Gray | A01B 69/008 701/410 |
| 2005/0273253 | A1 * | 12/2005 | Diekhans | G01C 21/20 701/50 |
| 2006/0047377 | A1 * | 3/2006 | Ferguson | E02F 9/205 701/2 |
| 2006/0175541 | A1 * | 8/2006 | Eglington | G05D 1/0221 250/221 |
| 2006/0178825 | A1 * | 8/2006 | Eglington | A01B 69/008 701/410 |
| 2006/0200294 | A1 * | 9/2006 | Scheufler | A01B 79/005 701/50 |
| 2006/0237200 | A1 * | 10/2006 | Unruh | A01B 69/004 172/2 |
| 2006/0282205 | A1 * | 12/2006 | Lange | A01B 69/008 701/50 |
| 2007/0021913 | A1 * | 1/2007 | Heiniger | A01B 69/008 701/412 |
| 2007/0299947 | A1 * | 12/2007 | El-Damhougy | H04W 76/028 709/223 |
| 2008/0105177 | A1 * | 5/2008 | Dix | A01C 7/087 111/200 |
| 2008/0167774 | A1 * | 7/2008 | Patel | G08G 1/20 701/36 |
| 2008/0215203 | A1 * | 9/2008 | Dix | A01B 69/008 701/26 |
| 2008/0235509 | A1 * | 9/2008 | Laberteaux | H04L 9/006 713/156 |
| 2008/0249692 | A1 * | 10/2008 | Dix | A01B 69/008 701/50 |
| 2009/0037041 | A1 * | 2/2009 | Senneff | A01B 69/008 701/23 |
| 2009/0192654 | A1 * | 7/2009 | Wendte | A01B 79/005 700/283 |
| 2009/0222160 | A1 | 9/2009 | Morselli et al. | |
| 2009/0234859 | A1 * | 9/2009 | Grigsby | G08G 1/161 |
| 2009/0312919 | A1 * | 12/2009 | Foster | A01B 79/005 701/50 |
| 2010/0018726 | A1 * | 1/2010 | Chiocco | A01B 69/008 172/1 |
| 2010/0036696 | A1 * | 2/2010 | Lang | A01B 79/005 705/7.39 |
| 2010/0042297 | A1 * | 2/2010 | Foster | H04W 4/70 701/50 |
| 2010/0094481 | A1 * | 4/2010 | Anderson | G05D 1/0295 701/1 |
| 2011/0112730 | A1 * | 5/2011 | Rekow | G05D 1/0219 701/50 |
| 2011/0113030 | A1 * | 5/2011 | Hunter | G06Q 10/00 707/736 |
| 2011/0153136 | A1 * | 6/2011 | Anderson | G05D 1/0219 701/25 |
| 2011/0153338 | A1 * | 6/2011 | Anderson | G01S 1/68 705/1.1 |
| 2011/0160961 | A1 * | 6/2011 | Wollenhaupt | A01B 69/008 701/41 |
| 2011/0160994 | A1 * | 6/2011 | Schmidt | A01B 79/005 701/532 |
| 2011/0166705 | A1 * | 7/2011 | Anderson | A01D 34/008 700/253 |
| 2011/0295424 | A1 * | 12/2011 | Johnson | A01D 34/008 700/248 |
| 2012/0101679 | A1 * | 4/2012 | Anderson | B25J 9/1671 701/23 |
| 2012/0169504 | A1 * | 7/2012 | Hillger | A01M 7/0089 340/603 |
| 2012/0237083 | A1 * | 9/2012 | Lange | G06K 9/00805 382/103 |
| 2013/0006419 | A1 * | 1/2013 | Bergstrom | A01D 34/008 700/245 |
| 2013/0041526 | A1 * | 2/2013 | Ouyang | G05D 1/0265 701/2 |
| 2013/0046525 | A1 * | 2/2013 | Ali | A01B 79/005 703/6 |
| 2013/0110322 | A1 * | 5/2013 | Jagenstedt | A01B 79/005 701/2 |

(56) References Cited

U.S. PATENT DOCUMENTS

| | | | | |
|---|---|---|---|---|
| 2013/0158772 | A1* | 6/2013 | Swenson | A01B 69/008 |
| | | | | 701/25 |
| 2013/0173321 | A1* | 7/2013 | Johnson | G06Q 10/06 |
| | | | | 705/7.12 |
| 2013/0174040 | A1* | 7/2013 | Johnson | G06Q 10/06 |
| | | | | 715/733 |
| 2013/0192183 | A1* | 8/2013 | Choi | A01D 34/008 |
| | | | | 56/10.2 A |
| 2013/0235758 | A1* | 9/2013 | Delmas | H04B 7/2606 |
| | | | | 370/254 |
| 2013/0342368 | A1* | 12/2013 | Nathanson | G07C 5/008 |
| | | | | 340/903 |
| 2014/0278696 | A1* | 9/2014 | Anderson | G06Q 10/06313 |
| | | | | 705/7.23 |
| 2014/0303814 | A1* | 10/2014 | Burema | A01B 79/005 |
| | | | | 701/3 |
| 2015/0034841 | A1 | 2/2015 | Shibutani et al. | |
| 2015/0234385 | A1* | 8/2015 | Sandin | G05D 1/0265 |
| | | | | 700/258 |
| 2015/0296707 | A1* | 10/2015 | Fukuda | A01D 34/008 |
| | | | | 701/25 |
| 2015/0331423 | A1* | 11/2015 | Volger | G01C 21/00 |
| | | | | 701/25 |
| 2015/0366129 | A1* | 12/2015 | Borinato | A01B 69/008 |
| | | | | 701/25 |
| 2016/0019560 | A1* | 1/2016 | Benkert | G06Q 30/0201 |
| | | | | 700/284 |
| 2016/0026940 | A1* | 1/2016 | Johnson | A01D 91/00 |
| | | | | 705/7.11 |
| 2016/0029545 | A1* | 2/2016 | Matthews | A01B 69/008 |
| | | | | 701/28 |
| 2016/0071410 | A1* | 3/2016 | Rupp | H04W 4/70 |
| | | | | 701/50 |
| 2016/0086291 | A1* | 3/2016 | Hunt | A01D 41/127 |
| | | | | 700/275 |
| 2016/0091898 | A1* | 3/2016 | Booher | G05D 1/0274 |
| | | | | 701/26 |
| 2016/0125331 | A1* | 5/2016 | Vollmar | G06Q 10/06311 |
| | | | | 705/7.13 |
| 2016/0129593 | A1* | 5/2016 | Wolowelsky | B25J 5/00 |
| | | | | 700/253 |
| 2016/0157275 | A1* | 6/2016 | Matthews | H04W 76/10 |
| | | | | 701/2 |
| 2016/0157422 | A1* | 6/2016 | Kohler | A01D 34/008 |
| | | | | 700/275 |
| 2016/0174459 | A1* | 6/2016 | Balutis | B25J 9/0081 |
| | | | | 701/25 |
| 2016/0189445 | A1* | 6/2016 | Schmidt | G07C 5/085 |
| | | | | 701/50 |
| 2016/0202227 | A1* | 7/2016 | Mathur | G06Q 50/02 |
| | | | | 702/2 |
| 2016/0232621 | A1* | 8/2016 | Ethington | G06Q 10/06315 |
| 2016/0306362 | A1* | 10/2016 | Pickett | G05D 1/0287 |
| 2017/0223888 | A1* | 8/2017 | Matthews | A01B 69/008 |

FOREIGN PATENT DOCUMENTS

| | | |
|---|---|---|
| EP | 1839479 A1 | 10/2007 |
| EP | 2169503 A2 | 3/2010 |
| WO | 2011085430 A1 | 7/2011 |
| WO | 2014105930 A1 | 7/2014 |

OTHER PUBLICATIONS

Butenuth, Mutthias and Heipke, Christian; "Network Snakes-Supported Extraction of Field Boundaries from Imagery"; DAGM 2005, LNCS 3663, pp. 417-424, 2005; Springer-Verlag, Berlin Heidelberg, Germany.

Kavzoglu, Jaafar and Mather; "Extraction of Field Boundary Information: Using Satellite Images—Classified by Artificial Neural Networks"; Innovations in GIS 8: Spatial Information and the Environment, edited by PJ Halls, London: Taylor & Francis, Chapter 4, 77-87.

Driscoll, Theresa Marie; "Complete coverage path planning in an agricultural environment" (2011). Graduate Thesis and Dissertations, Paper 12095, Iowa State University.

Oksanen, Timo; "Path Planning Algorithms for Agricultural Field Machines"; Helsinki University of Technology Automation Technology Laboratory Series A: Research Reports No. 31, Espoo, Dec. 2007.

* cited by examiner

AUTOMATING DISTRIBUTION OF WORK IN A FIELD

CROSS-REFERENCE TO RELATED APPLICATION

This application claims priority to U.S. provisional application entitled, "Automating Distribution of Work in a Field," having Ser. No. 61/844,476, filed Jul. 10, 2013, which is entirely incorporated herein by reference.

TECHNICAL FIELD

The present disclosure is generally related to agriculture technology, and, more particularly, computer-assisted farming.

BACKGROUND

Recent efforts have been made to automate or semi-automate farming operations. Such efforts serve not only to reduce operating costs but also improve working conditions on operators and reduce operator error, enabling gains in operational efficiency and yield. For instance, agricultural machines may employ a guidance system to reduce operator fatigue and costs.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
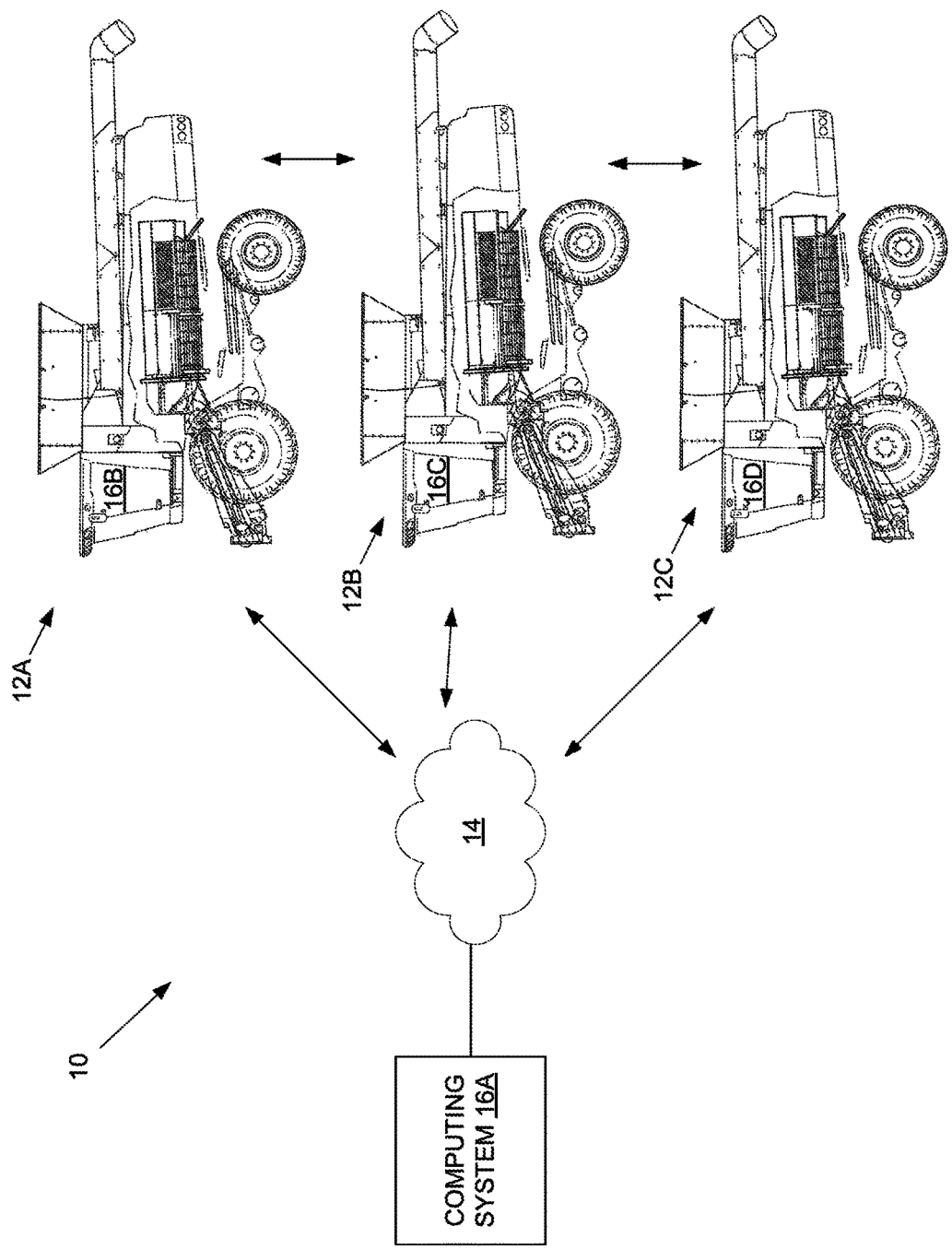
FIG. 1 is a schematic diagram that illustrates an example network topology for an embodiment of an auto-farm planning system.

In one embodiment, a method comprising identifying field boundaries from aerial imagery; detecting entry upon a first field by an agricultural machine without operator intervention, the first field within the identified field boundaries; and providing a first path to be traversed in the first field at least in part by the agricultural machine.

Detailed Description

Certain embodiments of an auto-farm planning system and method are disclosed that integrate several known technologies to enable path planning (e.g., waylines and A-lines as described below) and/or work redistribution without in most cases requiring operator intervention (e.g., direct or indirect input to prompt specific actions or tasks). For instance, as an agricultural machine travels along a road in close proximity to one or more fields, an embodiment of an auto-farm planning system automatically identifies field boundaries from aerial (including satellite) imagery (e.g., similar to Google maps, using satellite imagery or graphical objects corresponding to the same, though other mapping mechanisms that do not involve satellite imagery may be used). That is, the operator of the agricultural machine need only navigate the agricultural machine along the road, and the auto-farm planning system, using on-board navigational guidance systems, detects the positioning of the agricultural machine relative to the fields identified in the aerial imagery, and automatically identifies the boundaries of each proximally-located field. Such identification may include presenting on a display screen the aerial imagery, the identified boundaries, and highlighting (or visually distinguishing in other ways) the boundaries relative to other objects or features in the aerial imagery. The auto-farm planning system detects when the agricultural machine enters one of the fields located within the identified boundaries, and in some embodiments, may present an image of the agricultural machine (e.g., a real-time image, or a graphic of the agricultural machine) located within the field. Note that reference herein to imagery or images also includes graphics of the same. An embodiment of the auto-farm planning system, responsive to the agricultural machine entering the field, and without any further input by the operator, provides (e.g., calculates, or reproduces from cached storage based on a prior calculation) a path for the agricultural machine (and possibly other agricultural machines) to traverse to perform farming operations within the entire field. In some embodiments, the path may be embodied as waylines. The waylines may be calculated based on optical recognition from the aerial imagery of past farming features, such as detected furrows corresponding to past traversals of the field during farming operations, among other topological features detected in the imagery. In some embodiments, the path may be embodied as A-lines, which are waylines that have been generated by the auto-farm planning system based on one or more parameters to achieve optimal coverage of the field. For instance, parameters may include distance to be traveled in the field for complete farming coverage, estimated fuel consumption, the entry point into the field, and/or other inputs that are programmed, detected, and/or entered by the operator. In some embodiments, the operator may be given a choice (e.g., at startup for all or at least initial operations on a given field or on-the-fly when initiating farming in a given field) of which path to choose from, and responsive to operator selection, the agricultural machine implements operations according to the selected path.

Digressing briefly, many growers have taken advantage of guidance systems (e.g., global navigation satellite systems (GNSS), such as global positioning systems (GPS), GLO-NASS, Galileo, among other constellations) to improve the accuracy of their farming and reduce underlap and/or overlap and save on operating costs. Guidance systems rely on a path, typically referred to as waylines, to traverse a field. Additional information on example, yet non-limiting, wayline generation using, for instance, a working edge and a header or other implement width may be found in commonly-assigned patent application publication 20110160961. These waylines are manually defined by the operator. Further, when multiple machines enter a field to reduce the burden of any one agricultural machine, data transfer may be performed manually in the form of transfer of removable storage (e.g., USB sticks, SD cards, etc.) to share the waylines. However, these shared waylines may not result in a minimization of the path taken by each agricultural machine. In certain embodiments of auto-farm planning systems, simply by navigating (e.g., driving) the agricultural machine, field boundaries are automatically identified. As the operator navigates the agricultural machine onto the field to be farmed, a path that is optimal in coverage and efficiency (e.g., 100%) is automatically provided, removing the multiple steps often involved in today's processes that include manually defining and/or recalling existing waylines. In other words, in certain embodiments of auto-farm planning systems, there is no operator intervention in the identification, detection, and path provision. In some embodiments, the auto-farm planning system may query an operator as to a desired choice among provided paths (or in some embodiments, before generating a path or plural paths).

Having summarized certain features of auto-farm planning systems of the present disclosure, reference will now be made in detail to the description of the disclosure as illustrated in the drawings. While the disclosure will be described in connection with these drawings, there is no intent to limit it to the embodiment or embodiments disclosed herein. For instance, in the description that follows, one focus is on an agricultural machine embodied as a combine harvester, though it should be appreciated that some embodiments of auto-farm planning systems may use other agricultural machines, towed or self-propelled, and hence are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that reference herein to waylines includes those determined through optical recognition of prior farming operations on a given field, such as through the analysis of furrows that track the prior path of an agricultural machine during farming operations. Reference herein to A-lines refers to optimal or near optimal path or wayline generation.

Referring now to FIG. 1, shown is a schematic diagram that illustrates an example network topology for an embodiment of an auto-farm planning system 10. In one embodiment, the auto-farm planning system 10 comprises one or more agricultural machines 12 (e.g., three (3) shown in FIGS. 1, 12A, 12B, and 12C, though other quantities may be used in some embodiments), a network 14, which may include plural networks, and one or more computing systems 16. It should be appreciated within the context of the present disclosure that, though shown using agricultural machines 12 embodied as combine harvesters, some embodiments may utilize other agricultural machines (e.g., planters, sprayers, etc.) in the same or different quantities, and hence are contemplated to be within the scope of the disclosure. Further, it is noted that the combine harvesters 12 are shown in FIG. 1 without the attached header for purposes of brevity, with the understanding that one of a plurality of different types of headers may be used with each of the combine harvesters 12. The auto-farm planning system 10 is depicted in FIG. 1 with plural computing systems 16, including a remotely-located computing system 16A, and on-board computing systems 16B, 16C, and 16D (e.g., located in the cab or elsewhere in each agricultural machine 12).

The computing system 16A may be a server, computer (e.g., personal computer), or other type of computing device and/or software that is located at a business (e.g., farm, an Internet Service Provider (ISP) facility, regional or local agricultural machine manufacturer's representative facility, manufacturer's facility, among others), residence, or other locations remote from the field. The computing system 16A may be communicatively coupled to the computing systems 16B-16D over the network 14 in a master-slave arrangement, or in some embodiments, communicatively coupled to one of the computing systems 16 (e.g., 16B) in a master-slave arrangement, with the other computing systems 16C-16D communicatively coupled to the computing system 16B in a sub-master-slave arrangement. In some embodiments, communications among the computing systems 16A-16D may comprise a peer-to-peer manner of communication, ad-hoc, or a mix of any two or more of the aforementioned network topologies among others well-known to those having ordinary skill in the art.

The network 14 may include a wide area network, such as the Internet, and local area networks, such as a radio frequency (RF) network, cellular network, POTS, WiFi, WiMax, satellite, among others. For instance, the computing system 16A may host a web-service, or serve as a gateway to one or more other servers in the Internet, and be coupled to the computing systems 16B-16D of the agricultural machines 12A-12C, respectively, over a wireless, cellular connection. In some embodiments, a cellular connection may be implemented between the computing system 16A and the computing system 16B of the agricultural machine 12A, and communications between the computing systems 16B, 16C and 16D of the respective agricultural machines 12A, 12B and 12C is achieved through wireless RF. These and/or other mechanisms for achieving communications may be used, as should be appreciated by one having ordinary skill in the art in the context of the disclosure, and hence are contemplated to be within the scope of the disclosure.

The agricultural machines 12 are depicted as combine harvesters for illustrative purposes, and since operations of a combine harvester are known to those having ordinary skill in the art, further description of their operations are omitted here for brevity.

Figure 2:
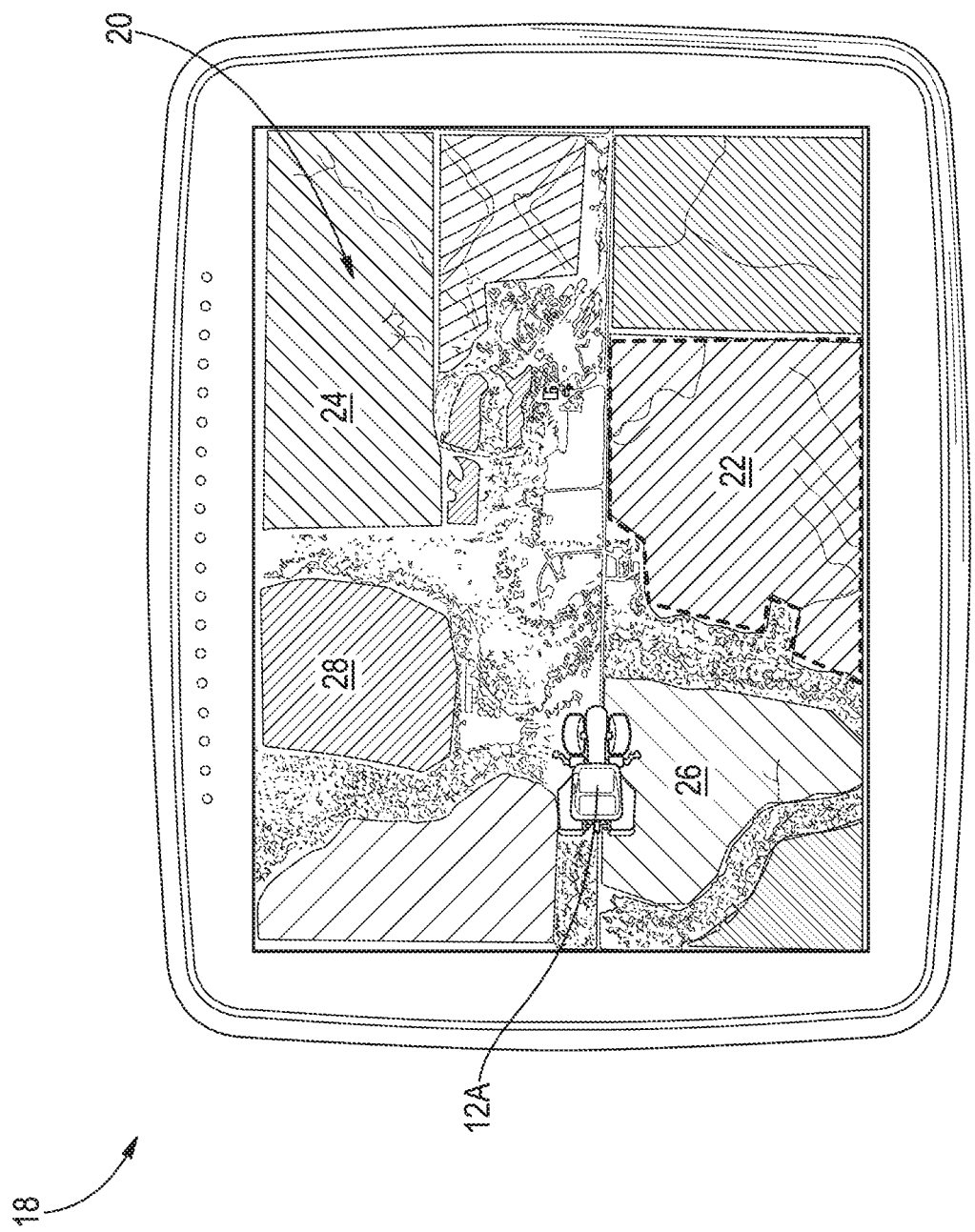
FIG. 2 is a screen diagram that illustrates an example display screen showing aerial imagery of plural fields and field boundaries identified by an embodiment of an auto-farm planning system.

In one example operation of an auto-farm planning system 10, and referring to an implementation initially where there is a single agricultural machine involved, such as agricultural machine 12A, an operator of the agricultural machine 12A may navigate the agricultural machine 12A down a road to reach a field. Note that reference to an operator may refer to an operator that is residing in the cab of the agricultural machine and manipulating on-board navigational controls. In some embodiments, reference to an operator may refer to an operator that is navigating the agricultural machine 12A from a remote location, such as in semi-autonomous farming implementations. In some embodiments, autonomous systems may be used where there is no direct operator influence on machine navigation. Attention is directed to FIG. 2 (with continued reference to FIG. 1), which shows a display screen 18 with aerial imagery 20 displayed thereon. Note that reference herein to display screens in FIGS. 2-7 also have a continued reference to FIG. 1. The display screen 18 may be part of, or otherwise associated with one or more of the computing systems 16, and in this example, is associated with the computing system 16B of the agricultural machine 12A. In some embodiments, the display screen 18 may be disposed on a portable communications device, such as a cell-phone, tablet, laptop, etc.), or be integrated in a virtual headset. As the operator navigates the agricultural machine 12A to a field to be farmed (e.g., in the case of combine harvesters, farming generally refers to harvesting crop material as the combine harvester traverses the field, including threshing, separating, and cleaning grain while discharging from the machine 12A material other than grain (MOG) as is known), the computing system 16B presents the top-down, aerial imagery 20 on the display screen 18 for observance by the operator (e.g., in the cab, or in some embodiments, at a remote location). In some embodiments, a local cache of maps may be installed in the computing system 16B, or in some embodiments, the aerial imagery 20 may be streamed to the computing system 16B in real-time or near real-time (e.g., continually, or on a periodic or aperiodic basis). The aerial imagery 20 comprises plural fields, such as fields 22, 24, 26, and 28, and an image of the agricultural machine 12A. In some embodiments, the aerial imagery 20 (and objects within it) may comprise a snapshot of real aerial imagery, or in some embodiments, a corresponding graphic (e.g., icon or symbol or geometrical objects translated from, and representing, the same), or a mix of each (e.g., a graphic representing the agricultural machine 12A overlaid on a snapshot of the real aerial imagery).

The boundaries of the fields 24-28 are identified by the computing system 16B (or in some embodiments, the computing system 16A) without operator intervention. Note that reference to processing performed by the computing system 16B also contemplates embodiments where such processing is may be performed by the computing system 16A (or other computing systems, such as those residing on other agricultural machines), and vice versa. As the operator navigates the agricultural machine 12A along the road, in close proximity (e.g., within a ten (10) mile radius, for instance) to the fields 22-28, the computing system 16B determines the boundaries of each of the fields, and highlights the boundaries as depicted in FIG. 2 for field 22 with dashed lines along the perimeter of the field 22. It should be appreciated that boundaries for the other fields 24-28 are likewise highlighted, but for facilitating an understanding of the description, the highlighted boundaries are only depicted for the field 22 in the examples that follows. As the agricultural machine 12A travels along the road, the computing system 16B updates the aerial imagery 20 to reflect the movement of the agricultural machine 12A, as is known according to various web-based navigators. In some embodiments, the computing system 16A located remotely from the field 22 may identify the boundaries and communicate the aerial imagery 20 and highlighted boundaries to the computing system 16B of the agricultural machine 12A. In either case, the identification of the boundaries is done without requiring operator input explicitly requesting or otherwise instructing the computing systems 16A or 16B to perform this function.

Note that some embodiments enable editing of the identified boundaries. For instance, if the boundaries are to be optimized (e.g., for minor corrections, for joint fields, etc.), the computing system 16B enables operator intervention to edit the boundaries.

Figure 3:
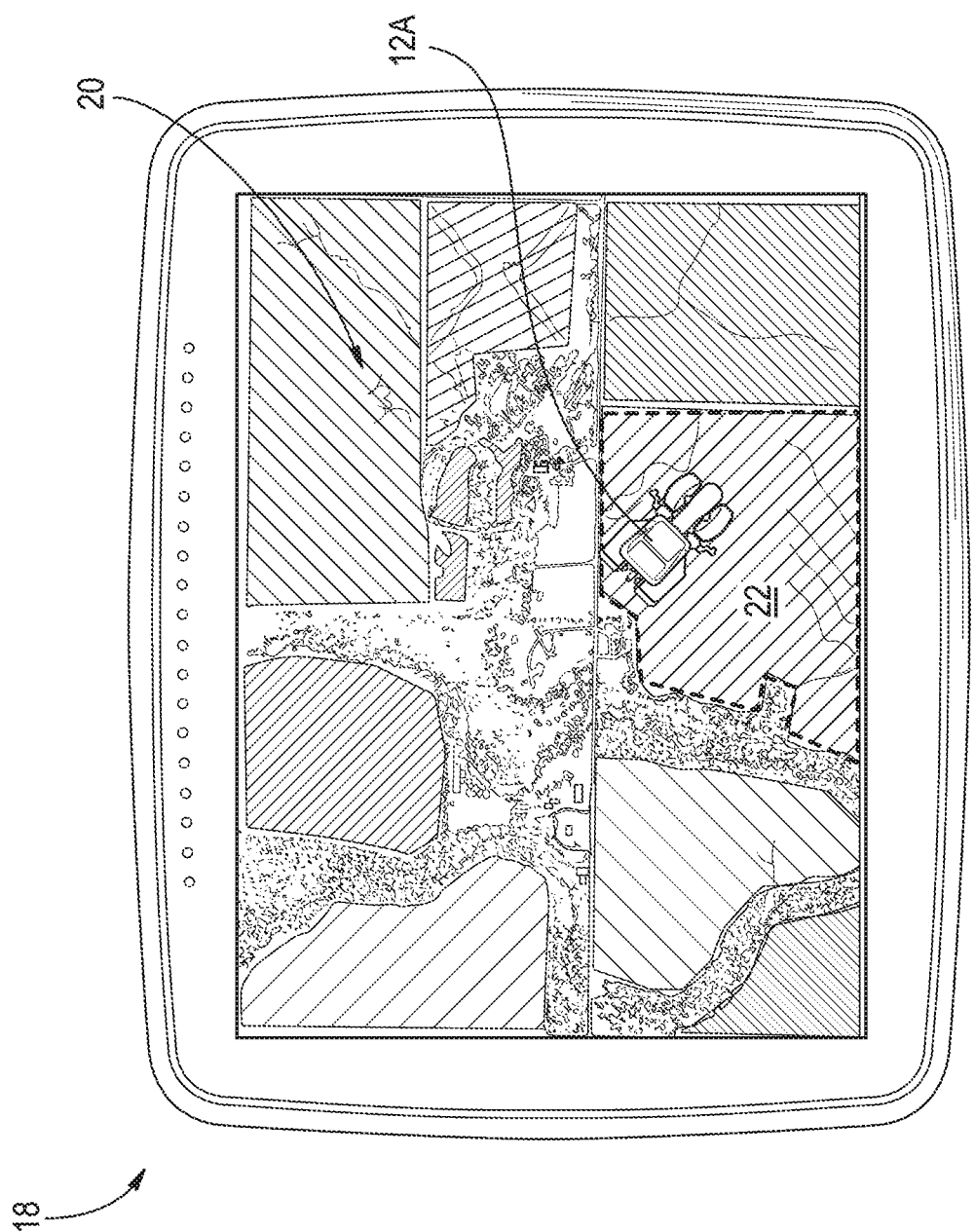
FIG. 3 is a screen diagram that illustrates an example display screen showing automatic field selection from aerial imagery by an embodiment of an auto-farm planning system.

Referring now to FIG. 3, with continued reference to FIG. 1, at a time corresponding to entry by the agricultural machine 12A onto the field 22, for instance, the computing system 16B (e.g., through cooperation with guidance systems of the agricultural machine 12A) detects the entry of the agricultural machine 12A onto the field 22 and records the entry point. For instance, the recording of the entry point may be helpful for future visits to the field 22 and associated path determinations. In some embodiments, the computing system 16A detects the entry of the agricultural machine 12A, as indicated generally above. In response to detecting the entry of the agricultural machine 12A onto the field, the computing system 16B selects the field 22. The selection of the field boundary can be communicated, if the selection is not already performed by the computing system 16A, to the remote computing system 16A over the network 14 (or manually, via saving the selected field onto a storage media and loading to the computing system 16A), which enables maintenance of one or more data structures (e.g., databases) of fields farmed using the agricultural machine. Other data may be stored, such as the manufacturer of the agricultural machine, the product dispensed on the field (e.g., in the case of planting or spraying applications), environmental conditions, among other useful data. The computing system 16B displays on the display screen 18 the aerial imagery 20 and the agricultural machine 12A residing in the highlighted field 22, as depicted in FIG. 3.

Figure 4:
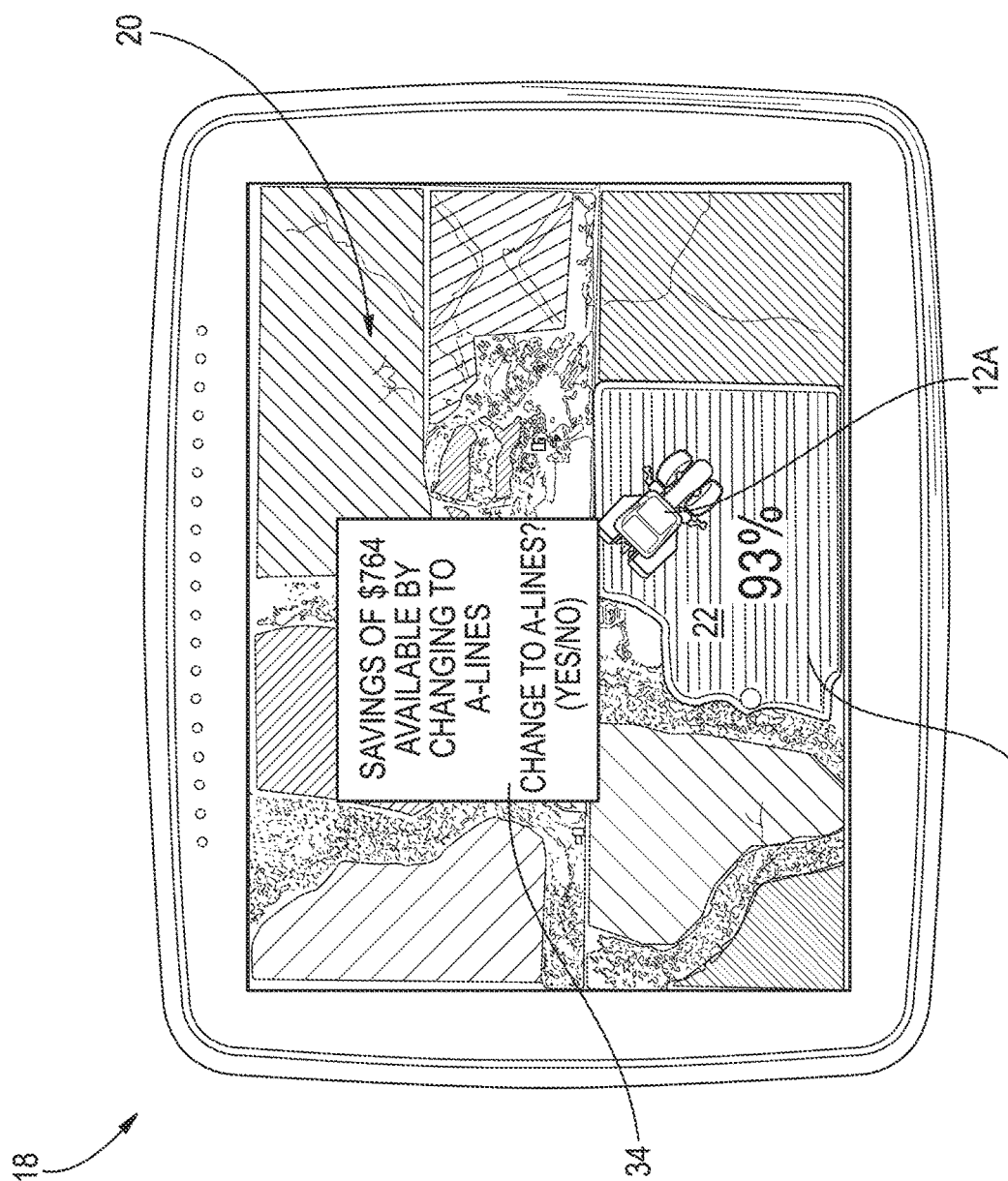
FIG. 4 is a screen diagram that illustrates an example display screen showing automatic path determination based on optical recognition of past farming features from aerial imagery by an embodiment of an auto-farm planning system.

In one embodiment, responsive to entry of the agricultural machine 12A onto the field 22, and without operator intervention (e.g., without input aside from navigating the agricultural machine 12B onto and within the field), the computing system 16B (or in some embodiments, offloaded to the computing system 16A or a processing collaboration of both computing systems 16A and 16B) determines and provides a path (e.g., waylines) that the agricultural machine 12A is to traverse, all or in part (e.g., the latter when sharing workload with other agricultural machines), to perform farming operations. Referring to FIG. 4 (where the highlighting is omitted hereinafter for brevity), the computing system 16B may reverse engineer the prior waylines used to farm the field 22 based on the aerial imagery. For instance, the computing system 16B (or in some embodiments, the computing system 16A, which then provides the calculations to the computing system 16B over the network, 14) may calculate waylines using optical recognition from the aerial imagery 20. The aerial imagery 20 may reveal furrows from prior farming operations on the field 22, which are used in the wayline calculations. The path 30 (e.g., the waylines) are presented on the display screen 18 overlaid on the aerial imagery 20.

Figure 5:
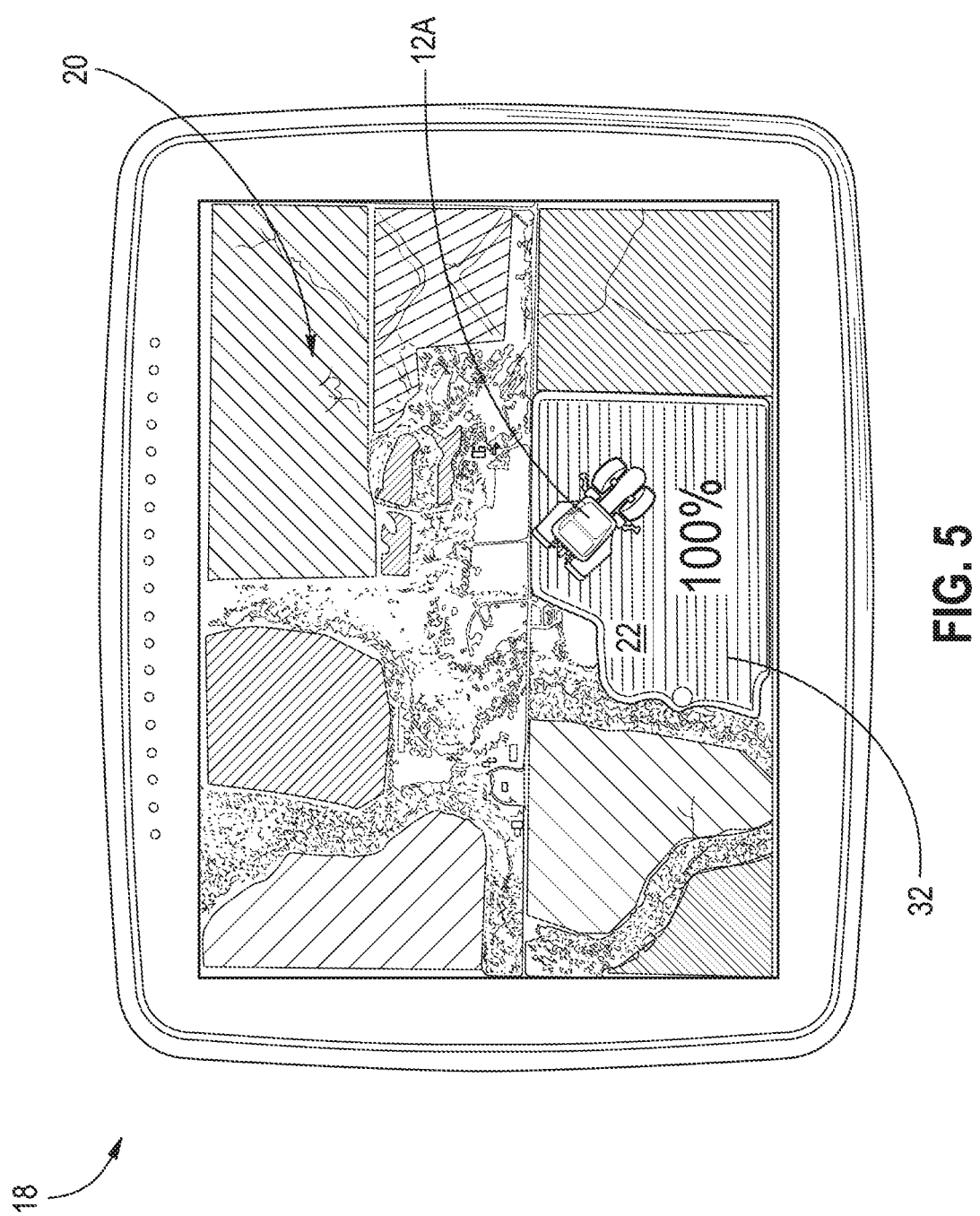
FIG. 5 is a screen diagram that illustrates an example display screen showing an optimal automatic path determination by an embodiment of an auto-farm planning system based on one or more parameters.

In some embodiments, the computing system 16B (or in some embodiments, the computing system 16A) may provide a path that is optimal. Referring to FIG. 5, shown is the provision (and display) of a path 32 embodied as A-lines. The computing system 16B may determine the A-lines from one or more parameters and their respective optimizations in covering farming operations of the field 22, including distance to be traveled by the agricultural machine 12A based on the identified boundaries, anticipated fuel consumption to cover the distance traveled, the entry point to the field 22, among other inputs. In some embodiments, the computing system 16B may receive operator inputs in the A-line determinations, such as customizations for certain features that are not revealed by the aerial imagery 20 (e.g., suitable directions on steep hills, avoidance of drainage tiles among other obstacles, etc.), and/or for customizations based in part of prior historical preferences in the manner of farming the field 22. Note that these operator inputted optimizations may be done once (e.g., the first time the auto-farm planning system 10 is implemented for the field 22), and then recorded for subsequent use of the path 32 (and hence without subsequent operator input). The A-line determinations may be based, at least in part, on existing path directions (e.g., based on the furrows identified through optical recognition of the aerial imagery 20).

Note that the displayed aerial imagery 20 may be a browser displayed web-page that the operator, residing in the cab of the agricultural machine 12B, may enter inputs into, or in some embodiments, a locally-generated graphical user interface (GUI, e.g., non-browser based) that populates the screen with the downloaded imagery.

In some embodiments, the determination as to which path 30 (FIG. 4) or 32 (FIG. 5) to provide to the operator (and hence be implemented during farming) may be implemented during a start-up session with auto-farm planning system software, in which the operator can be presented with an option to choose a default path determination (e.g., waylines or A-lines) at that time. The start-up session may also enable the operator to select an option where both path determinations are provided upon entering a field (e.g., either the first time or repeatedly for subsequent entries of the field), leaving the choice to the operator in real-time. For instance, with reference to FIG. 4, a pop-up window 34 may be presented to the operator at a time corresponding to (e.g., after) completion of path determinations using waylines (e.g., path 30) and A-lines (e.g., path 32). It should be appreciated that the use of a pop-up window 34 is for illustrative purposes, and that some embodiments may use other visual (or audio/verbal) mechanisms well-known in the art to alert the operator of different path determination options. In some embodiments, the path determinations also involve a determination of the efficiency of farming the field 22. For instance, assuming the efficiency of optimal path 32 at 100% (e.g., whether calculated with or without additional operator input), an efficiency of 93% may be determined for path 30. The efficiency values may be presented to the operator on each respective display screen 18 in FIG. 4 (e.g., 93%) and FIG. 5 (e.g., 100%) that an operator can toggle between, or together or comparatively (e.g., relatively) on a single display screen. For instance, in FIG. 4, both the efficiency (e.g., 93%) of the path 30 relative to the optimal path 32 and a tangible benefit to the difference in efficiency may be presented to the operator, as illustrated by the pop-up that states, "Savings of $764 available by changing to A-lines." It is also noted that FIG. 4 and FIG. 5 have efficiency values overlaid onto the aerial imagery 20, though other mechanisms and/or formats for presenting the efficiencies may be used, or in some embodiments, the efficiencies may not be presented at all.

As a brief background, growers have traditionally farmed a given field according to historical reasons (e.g., "that is the way dad always farmed the land"), and hence the grower may be reluctant to try another path (e.g., path 32). The presentation to the operator of benefits in the way of costs savings if the optimal path 32 is selected may be a strong motivator to consider a different path 32 than what has traditionally been taken (e.g., path 30). Variations to these efficiency values may be implemented in some embodiments. For instance, the operator may be able to select a menu option to affect changes to the savings, such as entering (or selecting) local gas rates, or chemical costs per distance, among other options to more tailor the cost savings. In some embodiments, the savings in time may be included as part of the comparison of paths 30 and 32.

Note that once the paths 30 or 32 have been selected, the operator then enables (e.g., engages) the guidance mechanisms of the agricultural machine 12A and begins farming according to the selected path 30 or 32. The computing system 16B may remotely (e.g., via communication to the computing system 16A) and/or locally cache the data corresponding to the aerial imagery 20 with the determined path 30 or 32, which can be activated the next time the agricultural machine 12A enters the field 22. The caching of the path determinations enables processing time to be reduced, and may reduce the bandwidth consumption between the computing system 16A and 16B. In that regard, the default option of presenting a choice between paths may, in some embodiments, be a one-time event (e.g., selectable as a one-time event), wherein all subsequent farming operations using the agricultural machine 12A may re-use the selected path. In some embodiments, the default option of presenting a comparison of both path determinations may be a repeated event (e.g., selectable repeated event), in view of differences in fuel costs (e.g., or other variables) over the years or changes to the field. Note that the boundary determinations (e.g., pre-path determinations) may similarly be cached locally or remotely, facilitating processing and reducing resource consumption when the fields 22-28 are displayed the next time the agricultural machine 12A returns to the road for accessing one of the fields 22-28.

Also noteworthy from the above description is that, unlike conventional systems, at no point in the planning process did the operator have to define a boundary (e.g., except if edits or customizations are made in the initial planning process when first employing an embodiment of an auto-farm planning system 10 to a field), select a field (e.g., except in the initial planning process if the default option is to be presented with a comparison of optimal path 32 versus historical path 30), or define or select a wayline (or A-line). It should be appreciated that, though the description above is focused on the benefits of using certain embodiments of auto-farm planning systems 10 with guidance-based agricultural equipment, benefits may be realized in manually-guided agricultural machines that are supplemented with visual systems (e.g., light-bars).

Figure 6:
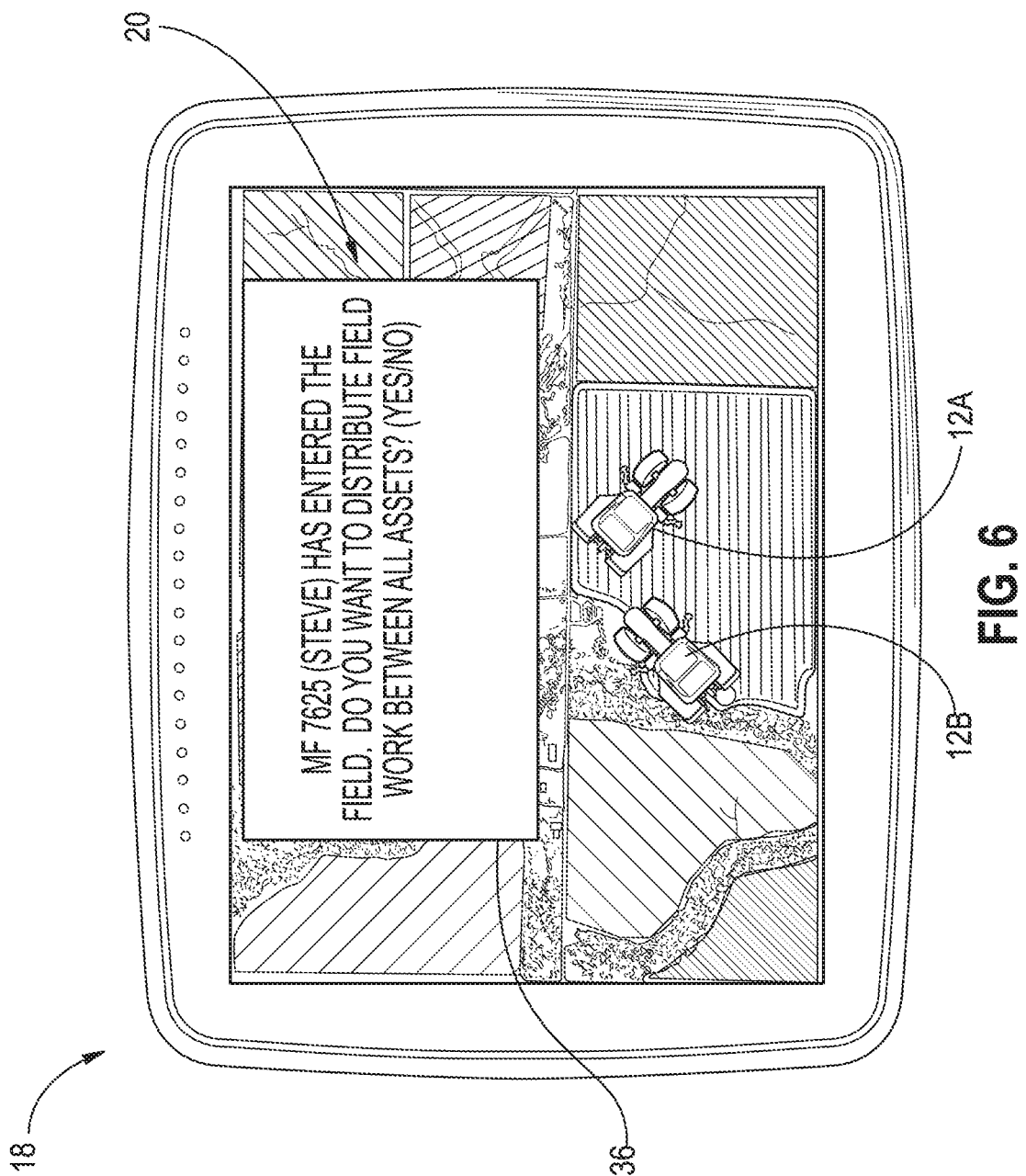
FIG. 6 is a screen diagram that illustrates an example display screen showing detection of another agricultural machine on a shared field by an embodiment of an auto-farm planning system.

Referring now to FIG. 6, shown on the example display screen 18 is the aerial imagery 20 with an optional pop-up window 36 overlaid on the aerial imagery 20. The pop-up window 36 may be presented responsive to detecting that an additional agricultural machine, such as agricultural machine 12B, passed the identified boundary of the field 22 and entered the field 22. The computing system 16B may detect (automatically) the presence of the agricultural machine 12B, or be alerted to the presence by the computing system 16A, by the newly entering agricultural machine 12B, and/or by the operator of the agricultural machine 12A in some embodiments. The pop-up window 36 alerts the operator of agricultural machine 12A, "MF 7625 (Steve) has entered the field. Do you want to distribute field work between all assets? (Yes/No)." Note that other variations to the manner of alerting the operator may be used. In other words, the computing system 16B (or in some embodiments, 16A) seeks to determine whether there is an interest by the operator in redistributing the work along the determined path amongst plural agricultural machines 12A and 12B. In some embodiments, the pop-up window 36 is not presented, and the default operation (which may be selected during a start-up session or once upon the event occurring for use in subsequent implementations of that or other fields) may be to proceed with the computing system 16B redistributing the work among its host machine (assuming the computing system performing the processing resides on the agricultural machine 12A) and the other agricultural machine 12B (and any additional agricultural machines that pass the boundary and enter the field 22) along the determined path. The computing system 16B may determine the redistribution of work (e.g., the split in work) along the determined path based on one or any combination of factors for the plural agricultural machines 12A and 12B, including the quantity of agricultural machines in the field 22, their respective capacities, implement width, speed, efficiency, among other factors (some of which may be inputted by the operator). One result of the redistribution of the work may be to reduce the number of turns that each agricultural machine 12A and 12B makes in traversing the determined path. Note that the depiction in FIG. 6 of two (2) agricultural machines 12A and 12B is merely illustrative, and that other quantities of agricultural machines may be used to farm the field 22 according to the shared (determined) path. In some embodiments, the operator is alerted by other known mechanisms (visually and/or verbally) in lieu of (or in addition to) the pop-up window 36.

Figure 7:
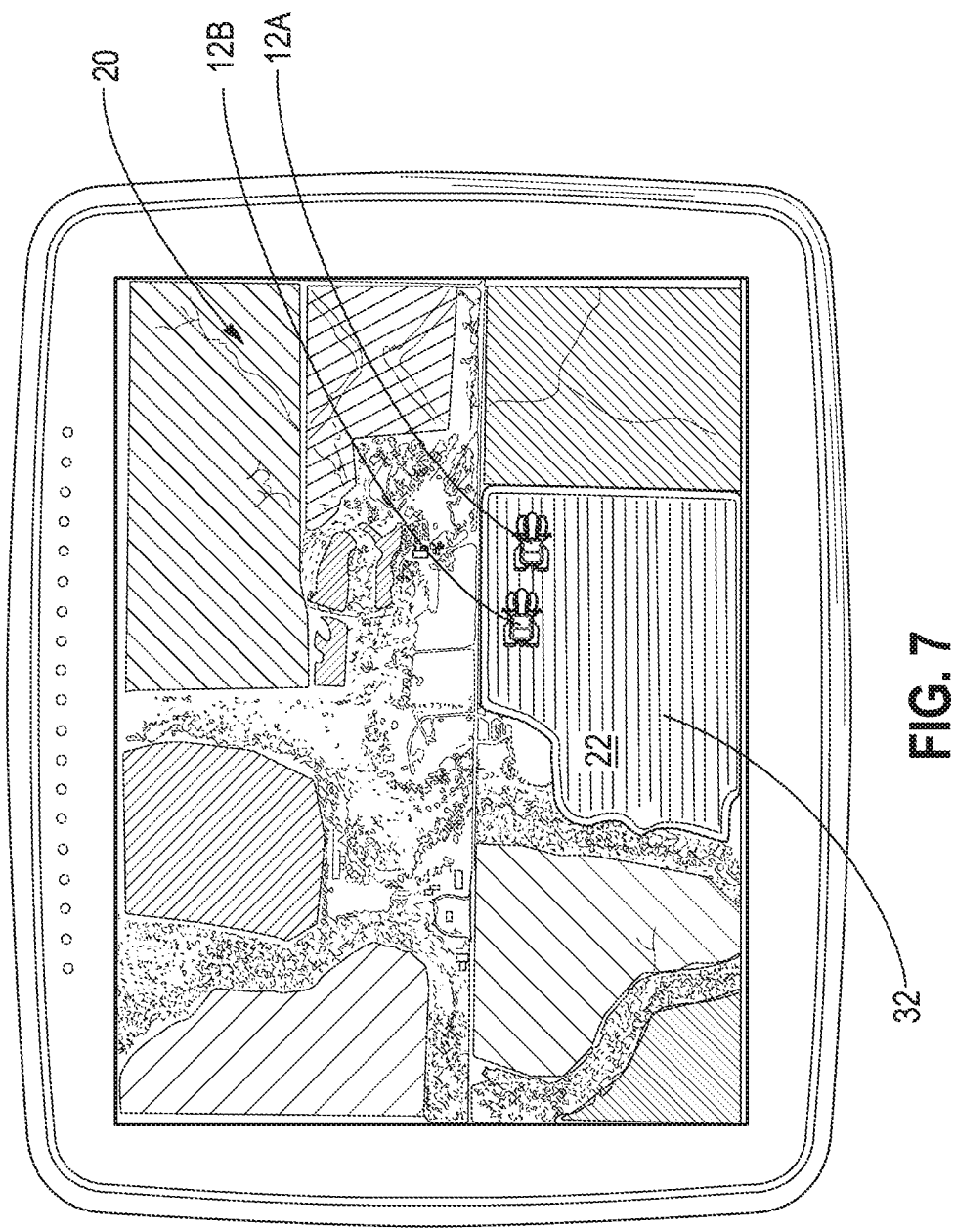
FIG. 7 is a screen diagram that illustrates an example display screen showing cooperation between plural agricultural machines on a shared field in an embodiment of an auto-farm planning system.

Responsive to the operator selecting "yes" (e.g., via touch screen selection, maneuvering a cursor via an input device, or buttons on a panel, voice-activation, etc.) to the query in the pop-up window 36 in FIG. 6 (or responsive to detecting the additional agricultural machine 12B in some embodiments that omit the pop-up window 36), the computing system 16B assigns tasks along the determined path for both agricultural machines 12A and 12B. FIG. 7 shows the aerial imagery 20 presented on the display screen 18, with the agricultural machines 12A and 12B shown overlaid on the aerial imagery 20 and moving within the imagery (and hence the field 22) along assigned routes of the path 32 (assuming, for instance, the optimal path 32 is selected). In some embodiments, the routes along the path 32 that each agricultural machine 12A and 12B has traversed may be visually distinguished from each other and/or from routes along the determined path 32 that are yet to be traversed. Also, it is noteworthy that the agricultural machines 12A and 12B show up on the display screen 18 of each agricultural machine 12A and 12B, making each operator aware of the other's presence in the field 22, and enabling constant monitoring by the operators of the respective machines 12A and 12B as to what tasks have been completed, which may be particularly important in farming operations where mere visual inspection through the windows of the respective cab by each operator of the field 22 (e.g., in spraying applications) may be ill-suited for revealing progress along the path 32. Stated otherwise, each operator is able to see the work performed by his or her respective agricultural machine 12A or 12B, as well as the work performed by the other agricultural machine 12A or 12B.

Figure 8A:
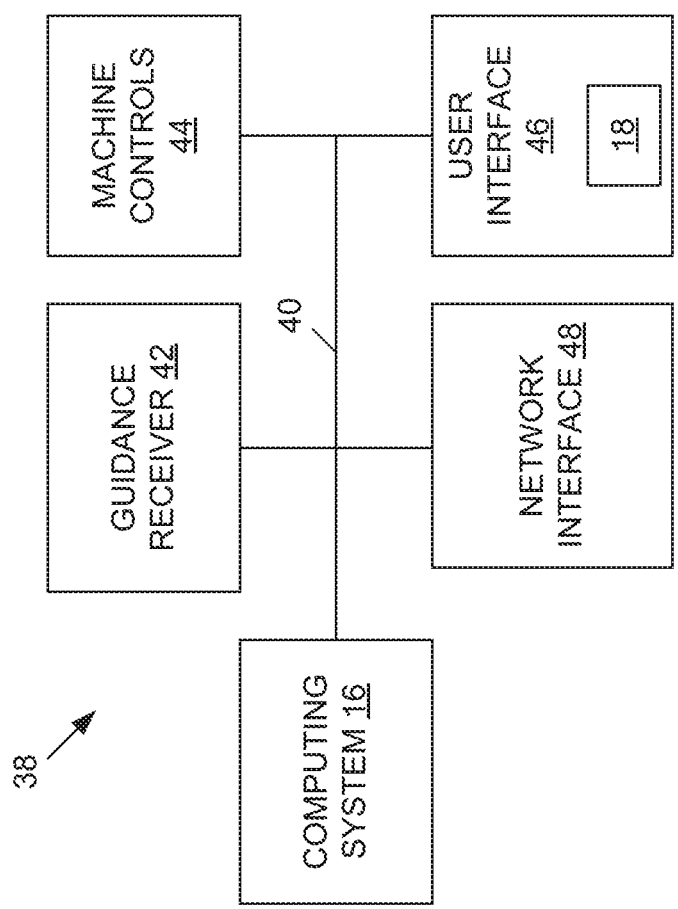
FIG. 8A is a block diagram that illustrates an embodiment of an example control system implemented in an embodiment of an auto-farm planning system.

Attention is now directed to FIG. 8A, which illustrates a control system 38 that may be used in an embodiment of an auto-farm planning system 10 (FIG. 1). It should be appreciated within the context of the present disclosure that some embodiments may include additional components or fewer or different components, and that the example depicted in FIG. 8A is merely illustrative of one embodiment among others. Further, in some embodiments, the same or similar architecture depicted in FIG. 8A may be used in each agricultural machine 12 (e.g., 12A-12C, FIG. 1). The control system 38 comprises the computing system 16. Note that the computing system 16, though depicted as a component of the control system 38, may be a stand-alone unit, such as when implemented remotely from the field to be farmed (e.g., computing system 16A). The computing system 16 is coupled in a network 40 (e.g., a CAN network or other network, and not limited to a single network) to a guidance receiver 42 (e.g., which includes the ability to access one or more constellations jointly or separately), machine controls 44, a user interface 46 (which in one embodiment includes the display screen 18), and a network interface 48. In some embodiments, functionality of the network interface 48 may be embedded in (or directly coupled to) the computing system 16, particularly for remote-server systems. The machine controls 44 collectively comprise the various actuators, sensors, and/or subsystems residing on the agricultural machine 12, including those used to control machine navigation (e.g., speed, direction (such as a steering system), etc.), implement (e.g., header or trailer) position, and/or control, internal processes, among others. The user interface 46 may be a keyboard, mouse, microphone, touch-type display device, joystick, steering wheel, or other devices (e.g., switches) that enable input by an operator and also enable monitoring of machine operations. As noted above, the display screen 18 may be a component of the user interface 46. The guidance receiver 42, as is known, may enable autonomous or semi-autonomous operation of the agricultural machine 12 in cooperation with the machine controls 44 and the computing system 16 (e.g., via guidance software residing in the computing system 16). The network interface 48 comprises hardware and software that enables wireless connection among computing systems 16 via the network 14 (FIG. 1) and/or over wireless RF, enabling communication via browser software to remote computing systems (e.g., computing system 16A) through cellular links, among other telephony communication mechanisms and radio frequency communications. The network interface 48 may comprise MAC and PHY components (e.g., radio circuitry, including transceivers, antennas, etc.), as should be appreciated by one having ordinary skill in the art. As indicated above, functionality of the network interface 48 (or other components of the control system 38) may be integrated into the computing system 16 in some embodiments.

The computing system 16 is configured to receive and process the information from the network interface 48, the guidance receiver 42, and/or the user interface 46. For instance, the computing system 16 may receive input from the display screen 18, such as to enable intervention of machine operation or during planning stages by the operator (e.g., customizations for boundary identification or path determination strategies) or selection and/or input of options (e.g., through set-up sessions, or real-time pop-up windows), as well as to enter various parameters. In some embodiments, the computing system 16 may receive input from the machine controls 44 (e.g., such as to enable feedback as to the position or status of certain devices, such as a header height and/or width, and/or speed, direction of the agricultural machine 12, etc.). The computing system 16 is also configured to cause the transmission of information (and/or enable the reception of information) via the network interface 48 with other computing systems 16.

Figure 8B:
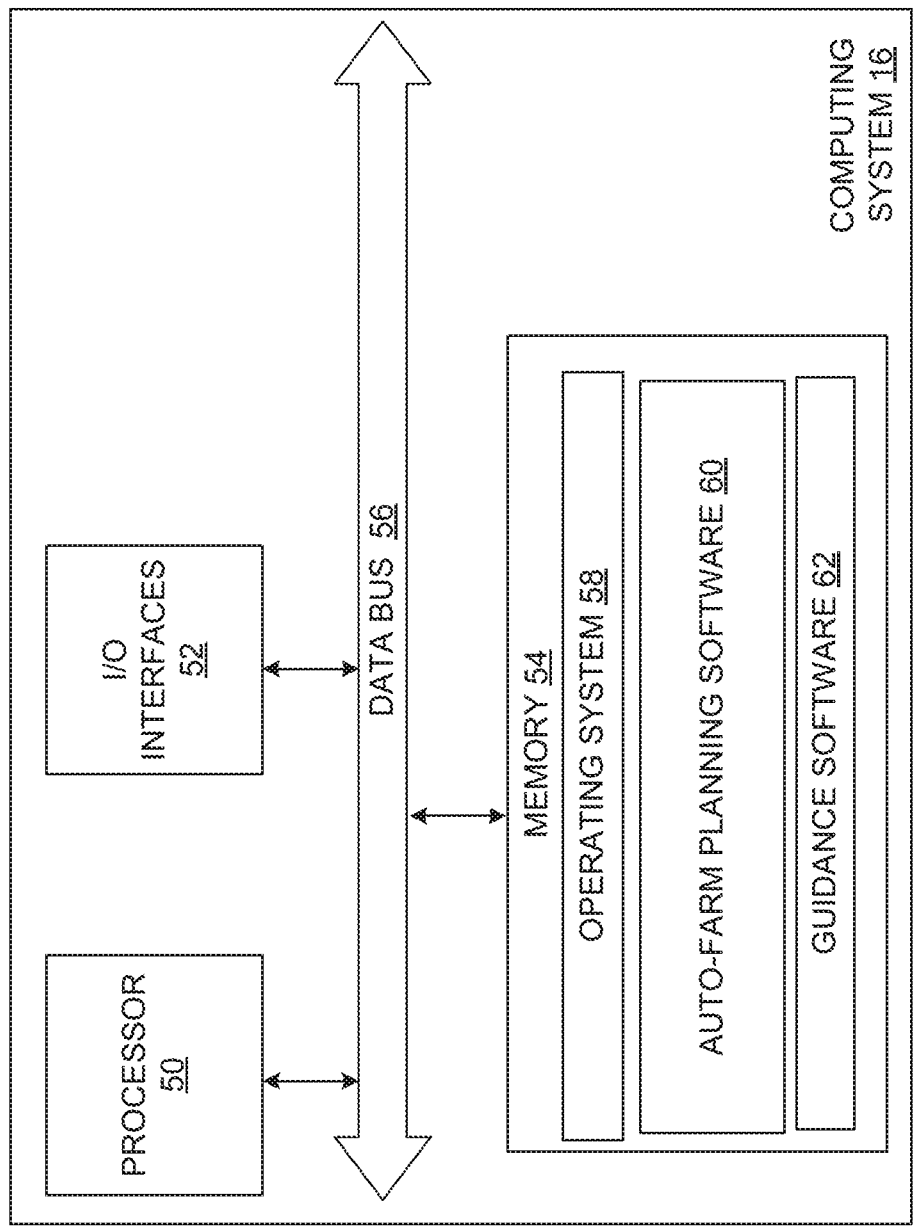
FIG. 8B is a block diagram that illustrates an embodiment of a computing system implemented in an embodiment of the control system of FIG. 8A.

FIG. 8B further illustrates an example embodiment of the computing system 16. One having ordinary skill in the art should appreciate in the context of the present disclosure that the example computing system 16 is merely illustrative, and that some embodiments of computing systems may comprise fewer or additional components, and/or some of the functionality associated with the various components depicted in FIG. 8B may be combined, or further distributed among additional modules, in some embodiments. It should be appreciated that, though described in the context of residing in the agricultural machine 12, in some embodiments, the computing system 16 or its corresponding functionality may be implemented in a computing device located outside of the field. Referring to FIG. 8B, with continued reference to FIG. 8A, the computing system 16 is depicted in this example as a computer system, but may be embodied as a programmable logic controller (PLC), FPGA, among other devices. It should be appreciated that certain well-known components of computer systems are omitted here to avoid obfuscating relevant features of the computing system 16. In one embodiment, the computing system 16 comprises one or more processors (also referred to herein as processor units or processing units), such as processor 50, input/output (I/O) interface(s) 52, and memory 54, all coupled to one or more data busses, such as data bus 56. The memory 54 may include any one or a combination of volatile memory elements (e.g., random-access memory RAM, such as DRAM, and SRAM, etc.) and nonvolatile memory elements (e.g., ROM, hard drive, tape, CDROM, etc.). The memory 54 may store a native operating system, one or more native applications, emulation systems, or emulated applications for any of a variety of operating systems and/or emulated hardware platforms, emulated operating systems, etc. In some embodiments, the memory 54 may store one or more field maps (e.g., aerial imagery of one or more fields), recorded entry points, identified boundaries of the one or more fields, determined paths previously determined, customizations, and other data pertinent to auto-farming planning implementations. In the embodiment depicted in FIG. 8B, the memory 54 comprises an operating system 58, auto-farm planning software 60, and guidance software 62. It should be appreciated that in some embodiments, additional or fewer software modules (e.g., combined functionality) may be employed in the memory 54 or additional memory. In some embodiments, a separate storage device may be coupled to the data bus 56, such as a persistent memory (e.g., optical, magnetic, and/or semiconductor memory and associated drives).

The auto-farm planning software 60 enables automatic identification of field boundaries for one or more fields, detection of entry to a given field (e.g., past the identified boundaries) by one or more agricultural machines 12 (FIG. 1) and the recording of the entry points, selection of a field, the determination of a path (e.g., waylines, A-lines) for farming the selected field, the detection of other agricultural machines that enter the field, and the redistribution of work among the agricultural machines 12 operating in the selected field. The auto-farm planning software 60 also enables the provision of aerial imagery, including the overlaid objects (e.g., the overlaid pop-up windows, the overlaid agricultural machines 12, determined path, etc.) on the display screen 18, as well as the communication to/from other computing systems 16 (e.g., via the I/O interfaces 52 and the network interface 48 of the control system 38) of determined plans, identified boundaries, and/or workload redistribution plans, among other pertinent data.

The guidance software 62 may coordinate inputs from the guidance receiver 42 and output control signals to one or more machine controls 44 to enable guided traversal and/or performance of various farming operations on a field based on the determined path provided by the auto-farm planning software 60. In some embodiments, the functionality (e.g., code) of the auto-farm planning software 60 may be embodied in the guidance software 62, and in some embodiments, the functionality (e.g., code) of the guidance software 62 may be embodied in the auto-farm planning software 60.

Execution of the software modules 60 and 62 may be implemented by the processor 50 under the management and/or control of the operating system 58. In some embodiments, the operating system 58 may be omitted and a more rudimentary manner of control implemented. The processor 50 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 16.

The I/O interfaces 52 provide one or more interfaces to the network 40 and other networks. In other words, the I/O interfaces 52 may comprise any number of interfaces for the input and output of signals (e.g., analog or digital data) for conveyance of information (e.g., data) over the network 40. The input may comprise input by an operator (local or remote) through the user interface 46 (e.g., a keyboard, joystick, steering wheel, or mouse or other input device (or audible input in some embodiments)), and input from signals carrying information from one or more of the components of the control system 38, such as the guidance receiver 42, machine controls 44, and/or the network interface 48, among other devices.

When certain embodiments of the computing system 16 are implemented at least in part as software (including firmware), as depicted in FIG. 8B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing system 16 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 9:
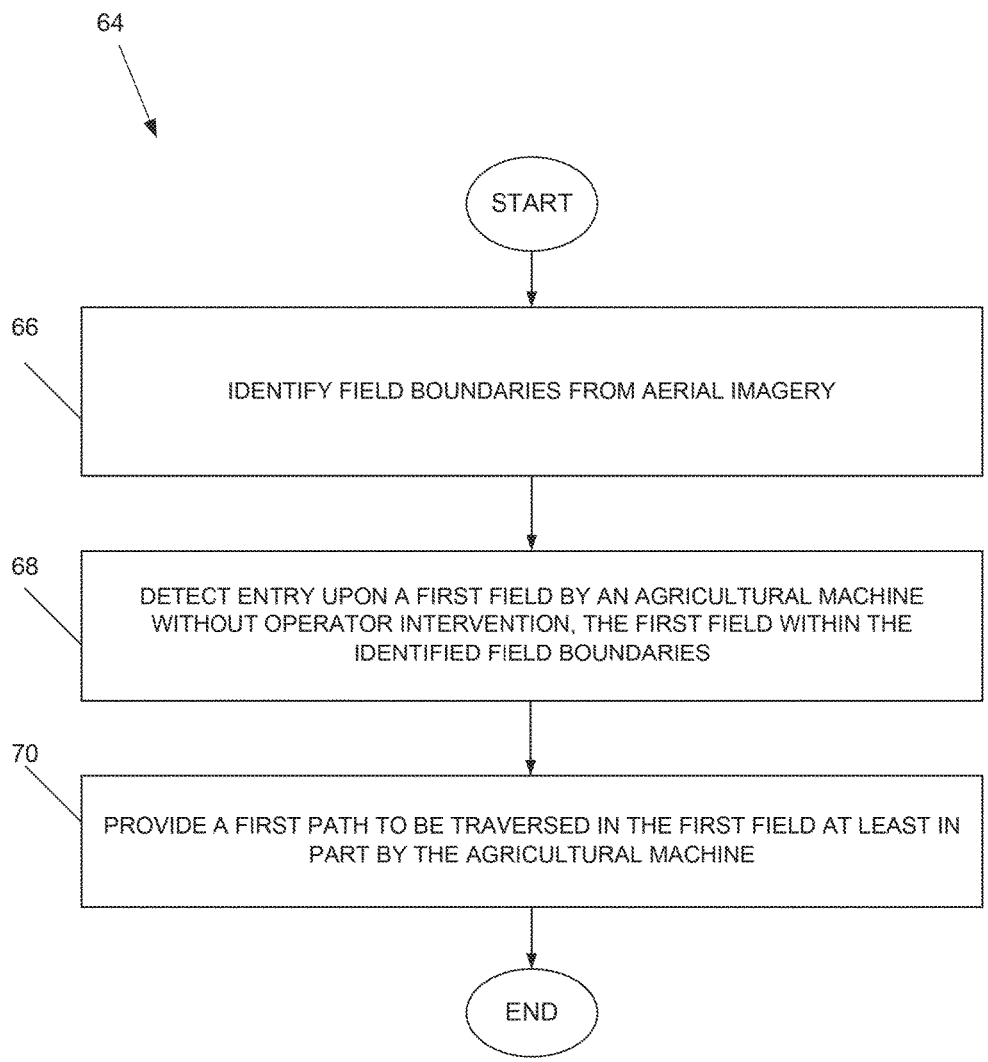
FIG. 9 is a flow diagram that illustrates an embodiment of an example auto-farm planning method.

In view of the above description, it should be appreciated that one embodiment of an auto-farm planning method 64, depicted in FIG. 9, comprises identifying field boundaries from aerial imagery (66); detecting entry upon a first field by an agricultural machine without operator intervention, the first field within the identified field boundaries (68); and providing a first path to be traversed in the first field at least in part by the agricultural machine (70).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

At least the following is claimed:

1. A method, comprising:
   identifying field boundaries from aerial imagery;
   detecting entry upon a first field by an agricultural machine without operator intervention, the first field within the identified field boundaries;
   providing a first path to be traversed in the first field at least in part by the agricultural machine; and
   providing a visual display of the identified field boundaries and the first path on a display screen, wherein the providing of the visual display comprises visually distinguishing a first portion of the first path traversed by the agricultural machine from one or more portions of the first path traversed by respective one or more additional agricultural machines assigned to the first path.

2. The method of claim 1, wherein the providing of the first path comprises calculating the first path that farms the entire first field based on one or a combination of distance to be traversed, estimated fuel consumption, or entry point to the first field.

3. The method of claim 1, wherein the providing of the first path comprises calculating the first path that farms the entire first field based on optical recognition of past farming features of the aerial imagery.

4. The method of claim 1, wherein the providing of the first path comprises providing the first path that farms the entire first field at a first efficiency value, and further comprising providing an alternative path to be traversed in the first field by the agricultural machine, the alternative path associated with a second efficiency value that is different than the first efficiency value.

5. The method of claim 4, further comprising providing an operator a selectable choice between the first path and the alternative path.

6. The method of claim 1, wherein prior to providing of the first path, providing an operator a selectable choice of providing either the first path or an alternative path, wherein the providing of the first path is responsive to the operator selecting an option corresponding to the first path.

7. The method of claim 1, wherein the identifying, detecting, and providing occur without an operator that is controlling movement of the agricultural machine selecting any input to prompt the identifying, detecting, or providing.

8. The method of claim 1, further comprising initiating commencement of autonomous farming operations on the first field according to the first path.

9. The method of claim 1, further comprising detecting when one or more additional agricultural machines enter the first field.

10. The method of claim 9, further comprising redistributing tasks of the agricultural machine along the first path for implementation to the agricultural machine and the one or more additional agricultural machines.

11. The method of claim 10, wherein the redistributing is based on one or more of quantity of agricultural machines in the first field, capacity of each of the agricultural machines in the first field, implement width for each of the agricultural machines in the first field, speed for each of the agricultural machines in the first field, or efficiency in handling of tasks associated with farming the first field for each of the agricultural machines in the first field.

12. The method of claim 1, further comprising enabling an operator to edit the first path.

13. The method of claim 1, wherein the identifying is responsive to the agricultural machine traveling in close proximity to the first field.

14. The method of claim 1, further comprising identifying additional field boundaries for one or more additional fields responsive to the agricultural machine traveling in close proximity to the first field and the one or more additional fields.

15. The method of claim 1, wherein the providing of the visual display comprises visually distinguishing the identified boundaries with other objects displayed on the display screen.

16. The method of claim 1, wherein the providing of the visual display comprises visually distinguishing a portion of the first path traversed by the agricultural machine from non-traversed portions of the first path.

17. An agricultural machine, comprising:
   a chassis coupled to rotating elements to cause traversal across a field;
   a wireless network interface; and
   a computing system configured to:
      identify field boundaries from aerial imagery responsive to the agricultural machine traveling in close proximity to a field located within the identified field boundaries;
      detect without operator intervention when the agricultural machine enters the field;
      provide a path to be traversed in the field at least in part by the agricultural machine, the path corresponding to a farming path for the entire field; and
      provide a visual display of the identified field boundaries and the first path on a display screen and visually distinguish a first portion of the first path traversed by the agricultural machine from one or more portions of the first path traversed by respective one or more additional agricultural machines assigned to the first path.

18. An agricultural machine, comprising:
a chassis coupled to rotating elements to cause traversal across a field;
a wireless network interface;
a display screen; and
a computing system comprising one or more processors configured to:
  identify on the display screen field boundaries from aerial imagery responsive to the agricultural machine traveling in close proximity to a field located within the identified field boundaries;
  detect without operator intervention when the agricultural machine enters the field and present an image corresponding to the agricultural machine on the display screen located within the field; and
  provide a display on the display screen, without operator intervention, of an editable path to be traversed in the field at least in part by the agricultural machine, the path corresponding to a farming path for the entire field.

* * * * *